United States Patent Office 3,503,784
Patented Mar. 31, 1970

3,503,784
SMOOTH SURFACED SHEET MATERIALS AND
METHOD OF MANUFACTURING THE SAME
Eiichi Morita, Okayama, and Osamu Fukushima, Kurashiki, Japan, assignors to Kurashiki Rayon Co., Ltd., Kurashiki, Japan
No Drawing. Filed Sept. 29, 1966, Ser. No. 583,060
Claims priority, application Japan, Oct. 15, 1965,
40/63,436
Int. Cl. B44d 1/14
U.S. Cl. 117—62.2
2 Claims

ABSTRACT OF THE DISCLOSURE

A flexible leather-sheet material having a very smooth surface, a high cold-proof and a grain break like a natural leather produced by the combination of the steps of: (1) applying a surface of the fibrous base substratum composed of a needle-punched synthetic fiber mat, with a dispersion of fine particles in a polymer solution, to impregnate said polymer solution into the fibrous base substratum and to deposit the fine particles on the surface of the fibrous base substratum; (2) coating the surface of the deposited layer of the fine particles with a polyurethane elastomeric solution; (3) treating the resultant sheet matrial with water or an aqueous solution of the solvent for the polyurethane elastomeric solution to coagulate the impregnated polymer solution and the coated polyurethane elastomeric solution; and (4) then drying said sheet material.

---

The present invention relates to sheet materials formed of a woven cloth, unwoven fibre mat, or unwoven fibre sheet as a substratum and a coated layer of a polymer thereon, particularly sheet materials as flexible as natural leather or skin which have great smoothness on the surface, and a method of manufacturing the same.

The leather-like sheet materials which have been manufactured at present may be roughly classified by the cross sectional structures into the following three groups:

(1) Those in which the substratum is composed of a woven fabric and the surface layer is composed of a coated polymer layer of spongy structure.

(2) Those in which the substratum is composed of an unwoven fiber sheet and the surface layer is composed of a coated polymer layer of spongy structure.

(3) Those in which the substratum is composed of an unwoven fibre sheet, an intermediate layer is composed of a woven cloth, and the surface layer is composed of a coated polymer layer of spongy structure.

Since woven fabrics and unwoven fibre sheets are both considerably uneven and rough on the surfaces, much difficulties are encountered in coating those surfaces with thin polymer layers in order to give sheet materials having sufficiently smooth surfaces.

It is an object of the present invention to provide sheet materials having a great smoothness on the surface and a method of manufacturing the same.

Another object of the invention is to provide flexible leather-like sheet materials which are highly cold-proof and have a leather-like grain break and a method of manufacturing the same.

The sheet materials formed in accordance with the present invention consist of three layers, i.e. a substratum of a woven cloth, unwoven fibre mat, or unwoven fibre sheet, a layer of fine powdery material or of a mixture of a fine powdery material and a polymer, and an overlying layer of a polymer.

Such sheet materials are obtained, for example, by filling a substratum of a woven cloth, unwoven fibre mat or unwoven fibre sheet which is impregnated with a polymer with a liquid dispersion of a fine powdery material of such a particle size that it will not pass through the substratum but will be deposited on the surface thereof or with a mixed dispersed solution prepared by dispersing said fine powdery materials in a polymer solution, in such manner as to correct the surface unevenness, and then by coating the filled cloth with a polymer solution, and by finally coagulating the polymer solution either by dry or wet process.

Usually when a polymer solution coated on a substratum dipped in a coagulating bath and the solvent for the polymer is removed to form a coated material, the volume of the polymer layer after completing the coagulation is one half or less of that of the original polymer solution layer. For this reason, while a very smooth film can be obtained by coating a smooth glass plate with a thin layer of a polymer solution and by coagulating the polymer solution, the same will not apply to the coating of glass plates having irregular surfaces. If an irregularly surfaced glass plate is coated with a polymer solution and then the solution is coagulated, the resulting film will have unevenness and lack surface smoothness even if the coating material is applied very uniformly. The film thus formed will become even more irregular when stretched. This reason is presumably based on the fact that the coagulating rate varies in each portion different in the thickness of the polymer solution layer and the portion of the thin solution layer is coagulated densely.

When a woven cloth or unwoven fibre sheet, in which coarse portion and dense portion are alternatively present and there are a large number of fine unevenness, and which absorbes a coated polymer solution, is used as a substratum and a polymer solution is coated on the substratum, after which the solution is coagulated, it is impossible to produce a sufficiently smooth surfaced sheet material.

In this view, the present inventors have searched for a way of manufacturing smooth surfaced sheet materials and accomplished the method of the present invention.

The sheet materials according to the invention are extremely preferable for substitutes for leather because they can have sufficiently smooth surfaces even if the coated polymer layer on the surface has a thickness of less than 0.5 mm.

The polymers to be used in accordance with the present invention are preferably elastic polymers, most preferably polyurethane elastomers, polyvinyl chlorides, polyacrylic acid esters, chlorinated polyolefins, and the like.

The fine powdery materials to be used in the invention may include all which will not pass through the substratum of woven cloth, unwoven fibre sheet, etc. but will remain on the substratum surface to smoothen it. An average particle size of these fine powdery materials is preferable in the range of 1 to 500 microns.

Suitable materials which can be used as the fine powdery materials are microcrystalline celluloses and polyvinyl alcohols, and fine powders of celluloses, polyvinyl alcohols, and starches. Also usable are fine powders of resins having a relatively high hardness, such as polystyrene, polymethacrylic acid, polyurea, melamine resins, phenol resins, and glass. Further, fine powders of various inorganic substances may also be used.

The present invention is illustrated by the following examples.

EXAMPLE 1

Chips of 45 parts of nylon-6 and 55 parts of polystyrene were mixed and melted homogeneously, extruded through a spinneret having 300 holes by an extruder into air and quenched to form filaments, which are heat drawn, crimped, and cut to produce a staple fibre of mixed spun filaments consisting of nylon-6 and polystyrene and having a size of 30 denier and a length of 50 mm.

The staple fibre was formed into a random web, which was then needle punched to a web form having a specific gravity of 0.18 g./cm.$^3$.

A mixed dispersed solution consisting of 26 parts of a polyurethane elastomer, 3 parts of microcrystalline cellulose (65% of which could pass through a 200 mesh screen), and 72 parts of dimethylformamide was forced into the web through one side thereof, in an amount of 5 times by weight of the total amount of the web. Thus, the web was impregnated with a part (about 10%) of the microcrystalline celluloses and polyurethane elastomer. Most (about 90%) of the microcrystalline celluloses did not enter the inside of the web but was deposited on the web surface to fully smoothen it.

Next, the web surface was coated uniformly with a 25% solution of polyurethane elastomer in dimethylformamide in such a way that the coated layer had a thickness of 0.3 mm. after the coagulation. The web was dipped in a 45% aqueous solution of dimethylformamide for 25 minutes, in a 30% aqueous solution of dimethylformamide for 25 minutes, and then in a 10% aqueous solution of dimethylformamide for 20 minutes to coagulate the solution of polyurethane elastomer, and was dried. The surface of the sheet material thus obtained was very smooth.

The sheet material was dipped in toluene at 80° C., repeatedly pressed for 45 minutes to dissolve off completely polystyrene in the fibre, and dried, embossed, and coloured on the surface to obtain a very smooth surfaced and flexible leather-like sheet material. This sheet material was comparable with natural leather in various physical properties, such as resistances to low temperature, bending, folding, and creasing.

EXAMPLE 2

A random web was formed of a staple fibre of polyamide (nylon-6) having a size of 2 deniers and a length of 50 mm. It was needle punched, and the fibres were bonded by using polyvinyl alcohol as a binder, and the web was buffed on both front and rear sides to obtain an unwoven cloth, the surface of which was smoothened to some extent. By the buffing, the surface was smooth macroscopically, but had numerous unevennesses microscopically and did not smooth.

Into the unwoven cloth thus obtained, a mixed dispersed solution consisting of 25 parts of a polyurethane elastomer, 3 parts of insoluble starch (of a particle size of 5 to 20μ), and 72 parts of dimethyl formamide was forced through one side of the cloth. In this way, the polyurethane elastomer was impregnated into the inner of the unwoven cloth and the insoluble starch was deposited on the surface of the unwoven cloth to smoothen it. Further, the surface of the unwoven cloth deposited with the insoluble starch was coated with a 20% solution of the polyurethane elastomer in dimethylformamide. The coated unwoven cloth was dipped in water to coagulate the polyurethane elastomer solution and dried to obtain a smooth surfaced flexible sheet material.

EXAMPLE 3

Forty-five parts of nylon-6 and 55 parts of polystyrene were mixed and melted extruded through a spinneret having 300 holes having hole diameter of 0.3 mm., cooled, hot drawn, crimped, and cut to obtain a staple fibre (with a size of 3 deniers and a length of 50 mm.) consisting of a mixture of nylon-6 and polystyrene.

A random web was formed of this staple fibre. After needle punching and binding of the fibres with polyvinyl alcohol, an unwoven cloth having a specific gravity of 0.18 was obtained. The surface of the unwoven cloth was smoothened by buffing but still retained numerous fine unevennesses.

From the buffed side of the unwoven cloth, a mixed dispersed solution consisting of 25 parts of a polyurethane elastomer, 3 parts of an insoluble starch (with a particle size of 5 to 20μ), and 72 parts of dimethylformamide was forced into the cloth to impregnate it with the dimethylformamide solution of polyurethane elastomer and to deposit the insoluble starch so as to smoothen the finely uneven surface of the unwoven cloth. Further, a mixed dispersed solution consisting of 20 parts of a polyurethane elastomer, 6 parts of macrocrystalline celluloses and 74 parts of dimethylformamide was applied uniformly on the starch deposited surface of the unwoven cloth. In addition, a polyurethane elastomer solution consisting of 22 parts of a polyurethane elastomer, 0.5 part of sorbitan monostearate, and 77.5 parts of dimethylformamide was coated on the cloth at a rate of 150 g. of the polyurethane elastomer per square meter of the cloth. The unwoven cloth was dipped in an aqueous solution of dimethylformamide to coagulate the polyurethane elastomer solution, washed with water, and dried.

The sheet material thus obtained was dipped in toluene at 80° C. for one hour to dissolve off completely the polystyrene in the fibre.

The resulting sheet material was a novel one composed of three different layers, i.e. (1) a porous coated layer of polyurethane elastomer, (2) a mixed layer of microcrystalline celluloses, in soluble starch, and polyurethane elastomer, and (3) a layer of unwoven cloth impregnated with polyurethane elastomer. The sheet material had a very smooth surface and was flexible, and it had physical properties similar to those of natural leather.

What we claim is:

1. A method of preparing a flexible highly cold-proof sheet material having a very smooth surface, and a grain break like a natural leather comprising the steps of: (1) applying to a surface of a fibrous base substratum composed of a needle-punched synthetic fiber mat a dispersion of fine particles of cellulose, polyvinyl alcohol or starch in a polymer solution to impregnate said polymer solution into the fibrous base substratum and to form a deposited layer of the fine particles which are suspended in the polymer solution on the surface of the fibrous base substratum; said polymer being selected from the group consisting of polyurethane elastomer, polyvinyl chloride, polyacrylic acid esters, and chlorinated polyolefins, (2) coating the surface of the deposited layer of the fine particles with a polyurethane elastomeric solution, (3) treating the resultant sheet material with water or an aqueous solution of the solvent for the polyurethane elastomeric solution to coagulate the impregnated polymer solution and the coated polyurethane elastomeric solution, and (4) then drying said sheet material.

2. A flexible high cold-proof sheet material having a very smooth surface, and grain break like a natural leather comprising a fibrous base substratum composed of a needle-punched synthetic fiber mat impregnated with a polymer, said polymer being selected from the group consisting of polyurethane elastomer, polyvinyl chloride, polyacrylic acid esters, and chlorinated polyolefins; a layer of fine particles of cellulose, polyvinyl alcohol or starch in said polymer at the surface of said fiber mat; and a coating consisting essentially of a polyurethane elastomer on said layer.

(References on following page)

References Cited

UNITED STATES PATENTS

| | | |
|---|---|---|
| 3,005,727 | 10/1961 | Stiles. |
| 3,085,731 | 4/1963 | Wilkins. |
| 3,238,056 | 3/1966 | Pall et al. |
| 3,288,632 | 11/1966 | Rush et al. |
| 3,362,845 | 1/1968 | Brundige. |
| 3,259,537 | 7/1966 | Battista _____ 117—144 X |

FOREIGN PATENTS 908,188  10/1962  Great Britain.

WILLIAM D. MARTIN, Primary Examiner

R. HUSACK, Assistant Examiner

U.S. Cl. X.R.

117—11, 58, 76, 86, 135.5, 138.8, 140